United States Patent

Barron, Jr. et al.

[11] Patent Number: 5,243,183
[45] Date of Patent: Sep. 7, 1993

[54] OBSTRUCTION POSITION DETECTING SYSTEM WITH COMPARISON AND MEMORY MEANS

[75] Inventors: Kenneth L. Barron, Jr., St. Charles, Ill.; Darrin L. Kohn, Carol Stream, both of Ill.

[73] Assignee: Triad Controls, Inc., Carol Stream, Ill.

[21] Appl. No.: 945,141

[22] Filed: Sep. 15, 1992

[51] Int. Cl.$^5$ ............................................. G01V 9/04
[52] U.S. Cl. .................................. 250/222.1; 250/221; 340/556
[58] Field of Search .................... 250/221, 222.1, 561, 250/557, 565; 340/556, 507, 555; 356/373, 375

[56] References Cited

U.S. PATENT DOCUMENTS

| | | | |
|---|---|---|---|
| 3,970,846 | 7/1976 | Schofield, Jr. et al. | 250/221 |
| 4,249,074 | 2/1981 | Zettler et al. | 250/221 |
| 4,566,337 | 1/1986 | Smart | 250/222.1 |

*Primary Examiner*—David C. Nelms
*Assistant Examiner*—Que T. Le
*Attorney, Agent, or Firm*—Douglas B. White

[57] ABSTRACT

The present invention employs a plurality of spaced light beam sources and corresponding photodetectors to form a light screen. A programmed microprocessor and memory circuitry senses the photodetector output and stores information on the position of an allowed obstruction. During operation of the equipment, the microprocessor repeatedly senses the photodetector output to determine which channels are blocked. When dangerous changes occur in the size, position or presence of an obstruction, the system alerts the operator or stops the equipment.

11 Claims, 3 Drawing Sheets

RECEIVER UNIT

OBSTRUCTION POSITION DETECTING SYSTEM WITH COMPARISON AND MEMORY MEANS

BACKGROUND OF THE INVENTION

1. Field of the Invention

The present invention relates to intrusion detection systems and particularly to safety systems used on industrial machines. This improvement relates to means for presetting an acceptable obstruction.

2. Description of the Prior Art

Intrusion detection systems employing light beams are well known and typified in U.S. Pat. Nos. 4,249,074 and 3,970,846. These systems employ light beam sources and photodetectors to create a screen, and then monitor the beams (photodetector output) to detect an intrusion. In U.S. Pat. No. 4,249,074 a system is proposed which detects an impermissible intrusion, such as an operator's hand, by counting the number of consecutive beams which are interrupted. However, a need exists for the system which allows a specific obstruction (i.e. work bench) or detects the absence of an obstruction (i.e. feed stock).

SUMMARY OF THE INVENTION

The present invention employs a plurality of spaced light beam sources and corresponding photodetectors to form a light screen. A programmed microprocessor and memory circuitry senses the photodetector outputs, during a sequential scan, and stores information in memory on the location of an allowed obstruction by storing information on the location of initially blocked beams. During operation of the equipment, when changes occur in the size or the position of the obstruction, the system uses a programmed microprocessor to compare blocked beams to the stored information to analyze this change and to detect an impermissible intrusion.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
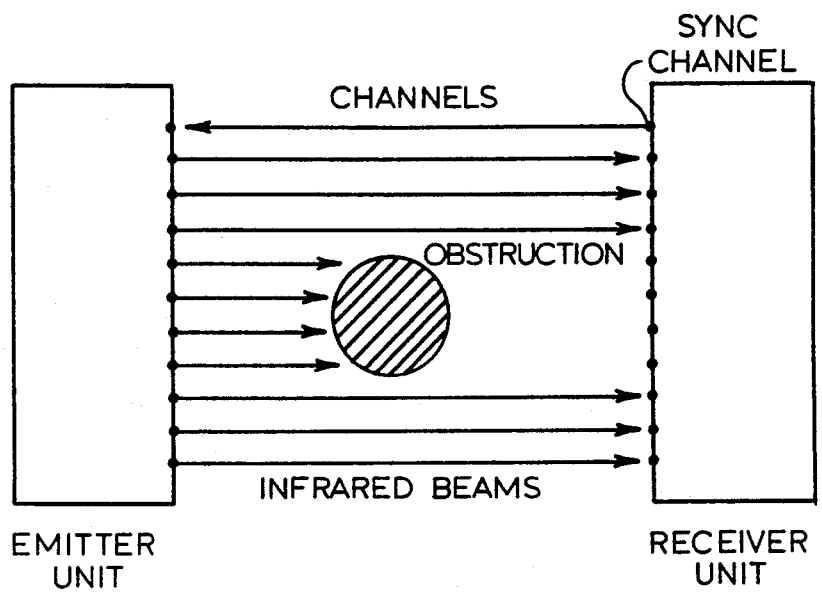
FIG. 1 is a pictorial view of the light screen concept showing an obstruction blocking certain light beams.

Turning first to FIG. 1 there is shown a representation of a light screen for detecting intrusions, the generation and utilization of which is well known in the art. A plurality of light emitting (typically infrared) sources are positioned in spaced relation along the emitter side of an opening of a machine, and photodetectors are similarly positioned along the receiver side of the opening to receive the emitted light beams. Each photodetector is paired to a light emitting source to define a channel therebetween. When an obstruction is positioned between the emitting unit and the receiving unit, channels will be blocked and no signal will be present at the photodetector in the receiving unit.

The novel improvement of the present invention records the initial position of a permissible obstruction. When the obstruction pattern changes or moves, this system monitors such change and determines whether there is an impermissible intrusion or other event which requires a shut down of machinery or operator alert. By holding the initial obstructed pattern in a microprocessor memory, the change in blocked light beam channels is analyzed by the microprocessor programming to determine if the allowable obstruction was removed or repositioned, or if the detected change indicates a dangerous condition.

Figure 2:
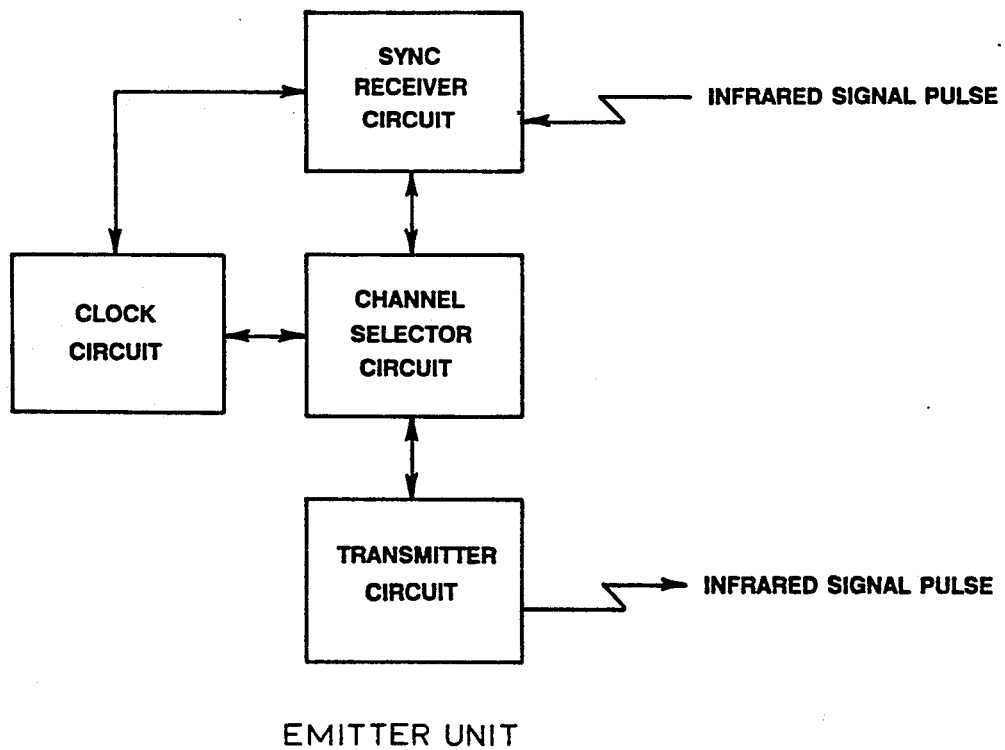
FIG. 2 is a block diagram of the circuitry controlling the emission of the light beams.
Figure 3:
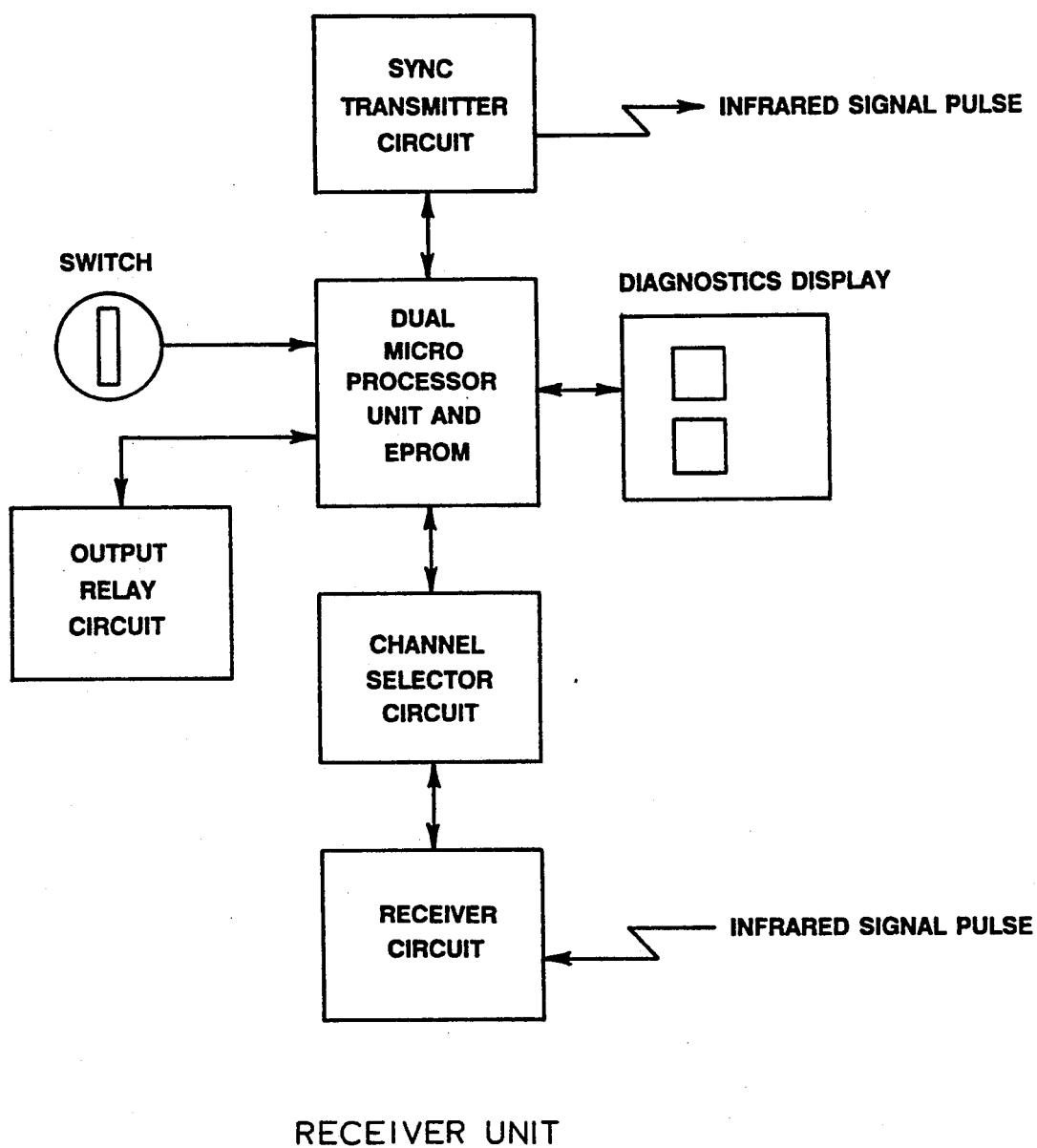
FIG. 3 is a block diagram of the circuitry controlling the reception and analysis of the light beams.

The electrical hardware of the present invention is shown in block diagram form in FIGS. 2 and 3. The light emitter circuit receives a synchronizing infrared signal generated at the receiver unit and then sequentially activates the infrared transmitter for each channel at regular intervals determined by the clock. The receiver unit likewise begins with the sync signal and sequentially monitors each channel receiver synchronously with the emitter unit. This monitoring is under control of the microprocessor and EPROM memory (FIG. 3) which is used to establish an allowable channel obstruction pattern, to analyze any change, and to operate the relay circuitry (to shut down the equipment) when a change in the sensed obstruction is not permissible. An external switch is used to instruct the microprocessor to select the mode of operation: "Reset", to set the allowable obstruction; or "Run", to monitor the light screen and analyze any change during operation of the machinery.

Figure 4:
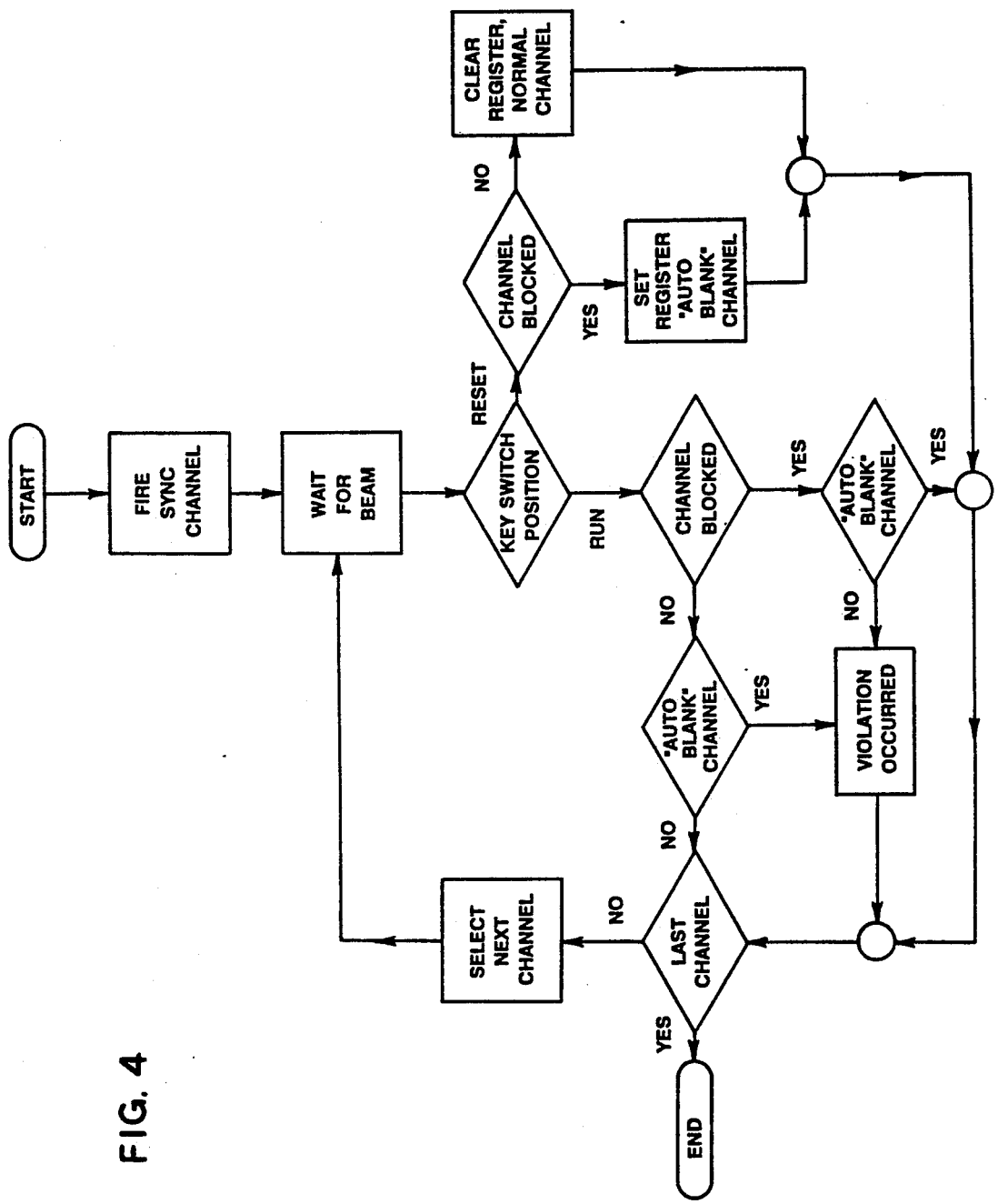
FIG. 4 is a flow diagram of the programming of the microprocessor.

The software program for the microprocessor is physically located in the EPROM and is shown as a flow diagram in FIG. 4. Once a sync signal initiates the scan of the photodetector outputs, this decisional logic causes the circuit to monitor and test the channels. The position on the key switch determines the mode of operation: whether the location of an obstruction is being recorded as allowable ("Reset" mode) or whether the location of blocked beams is being tested against the recorded obstruction ("Run" mode).

As depicted in FIG. 4, when in the Reset mode the channels are examined sequentially; and if a channel is blocked, information on the location of that blocked channel is stored in a memory (Auto Blank Register). If the channel is not blocked then the corresponding register memory is cleared. This testing and storing of blocked locations continues until all channels are examined, whereupon the system is ready to be placed in the "Run" mode.

When the key switch is set to Run, then each channel is similarly checked for blockage. But in this mode, if the channel is determined to be blocked, then the Auto Blank Register is checked to see if it is an allowable obstruction. If it is not an allowable obstruction, then a violation is declared, causing the relays to shut down the equipment or an alert to be sounded.

In a further mode of operation, once the microprocessor has detected and stored the location of blocked channels, the software manipulates the stored data to (1) detect the removal of the obstruction (the system detects no blockage on channels originally stored as blocked) and (2) detect the movement of an obstruction (the detected blocked channels are the same in number and relative position as the stored locations of blocked channels even though they are in a different absolute location.) This mode of operation is the same as the previously described "Run" mode, except that when a blocked channel is found which is not an "Auto Blank" channel, the system completes scanning all channels and then performs an additional analysis: (1) if *all* "Auto Blank" channels are unblocked then the obstruction has been removed; and (2) if the blocked channels are the same in number but shifted so the relative position is the same, then the obstruction has moved. This additional logic is added to the logic of FIG. 4, and the programming required to implement these steps is well within the capabilities of those skilled in the art.

From the foregoing description, it will be apparent that modifications can be made to the apparatus and method for using same without departing from the teachings of the present invention. Accordingly, the scope of the invention is only to the limited as necessitated by the accompanying claims.

We claim:

1. In a presence detection apparatus having a plurality of sets of light beam sources and photodetectors, the source and photodetector of each set defining a light beam channel and being disposed so the light beam from the source impinges upon the photodetector in the absence of an obstruction in the light beam channel, said sets of light beam channels being arranged at predetermined locations to define a screen, the improvement comprising:

sensing means for sensing the output of each photodetector to detect blocked light beam channels;

memory means coupled to said sensing means for storing the location of blocked light beam channels; and comparison means coupled to said sensing means and said memory means for comparing the location of sensed blocked light beam channels with stored locations of blocked light beam channels.

2. The presence detection apparatus of claim 1 wherein said sensing means, said memory means, and said comparison means are under the control of programmed microprocessor means.

3. The presence detection apparatus of claim 3 further comprising switch means coupled to said comparison means for providing a switched output signal in response to a predetermined change in said blocked light beam channels.

4. The presence detection apparatus of claim 2 wherein said microprocessor means is programmed to detect a difference between the location of sensed blocked light beam channels and stored locations of blocked light beam channels.

5. The presence detection apparatus of claim 4 wherein said microprocessor means is programmed to detect the removal of an obstruction.

6. The presence detection apparatus of claim 5 wherein said microprocessor is programmed to detect the movement of an obstruction.

7. In a presence detection method, wherein the presence detection apparatus includes a plurality of sets of light beam sources and photodetectors, the source and photodetector of each set defining a light beam channel and being disposed so the light beam from the source impinges upon the photodetector in the absence of an obstruction in the light beam channel, said sets of light beam channels being arranged at predetermined locations to define a screen, the improvement comprising the steps of:

sensing the initial output of said photodetectors to determine whether a light beam channel is blocked and thereby detect an allowable obstruction;

storing the location of blocked light beam channels in memory;

sensing the subsequent output of said photodetectors to determine whether a light beam channel is subsequently blocked; and comparing the location of subsequently blocked light beam channels to said stored locations.

8. The presence detection method of claim 7 wherein said photodetector outputs are sensed sequentially at defined time intervals.

9. The presence detection method of claim 8 further comprising the step of continuing to compare said locations of blocked light beam channels to said stored locations until instructed to store new locations of blocked light beam channels.

10. The presence detection method of claim 7 further comprising the step of analyzing said compared locations of blocked light beam channels to detect the removal of an obstruction.

11. The presence detection method of claim 7 further comprising the step of analyzing said compared locations of blocked light beam channels to detect the movement of an obstruction.

* * * * *